(12) United States Patent
Puetter et al.

(10) Patent No.: US 10,304,167 B2
(45) Date of Patent: May 28, 2019

(54) SPATIALLY ADAPTIVE TONE MAPPING OPERATOR

(71) Applicant: Micro USA, Inc., Poway, CA (US)

(72) Inventors: Richard C. Puetter, San Diego, CA (US); Vesa Junkkarinen, San Diego, CA (US)

(73) Assignee: Micro USA, Inc., Poway, CA (US)

( * ) Notice: Subject to any disclaimer, the term of this patent is extended or adjusted under 35 U.S.C. 154(b) by 5 days.

(21) Appl. No.: 15/647,120

(22) Filed: Jul. 11, 2017

(65) Prior Publication Data
US 2018/0012339 A1   Jan. 11, 2018

Related U.S. Application Data

(60) Provisional application No. 62/360,888, filed on Jul. 11, 2016.

(51) Int. Cl.
*G06T 5/00*   (2006.01)

(52) U.S. Cl.
CPC .............. *G06T 5/002* (2013.01); *G06T 5/007* (2013.01); *G06T 5/008* (2013.01); *G06T 2207/10016* (2013.01); *G06T 2207/10024* (2013.01); *G06T 2207/20208* (2013.01)

(58) Field of Classification Search
CPC . G06T 2207/10016; G06T 2207/10024; G06T 2207/20208; G06T 5/002; G06T 5/007; G06T 5/008
See application file for complete search history.

(56) References Cited

U.S. PATENT DOCUMENTS

| | | | |
|---|---|---|---|
| 8,786,732 B2* | 7/2014 | Puetter | H04N 5/35563 |
| | | | 257/291 |
| 2014/0152694 A1 | 6/2014 | Narasimha et al. | |

OTHER PUBLICATIONS

Biswas K. K. et al., "A Simple Spatial Tone Mapping Operator for High Dynamic Range Images," Published in: Thirteenth Color Imaging Conference: Color Science and Engineering Systems, Technologies, and Applications, Scottsdale, Arizona; Nov. 2005, pp. 291-296.
Debevec, P. , "Rendering Synthetic Objects into Real Scenes: Bridging Traditional and Imabe-based Graphics with Global Illumination and High Dynamic Range Photography", Proc. ACM SIGGRAPH 98, M. Cohen, Ed., pp. 189-198, Jul. 1998.

(Continued)

*Primary Examiner* — Manuchehr Rahmjoo
(74) *Attorney, Agent, or Firm* — Eleanor Musick; Musick Davison LLP

(57) ABSTRACT

A method for spatially-adaptive tone mapping in an image having high dynamic range includes using a computing device to receive an input image from an image sensor comprising a plurality of pixels having pixel locations and determine within the input image a plurality of local size scales, each comprising a neighborhood having substantially constant illumination. The variation in reflectance within each neighborhood is estimated and local contrast within each neighborhood is enhanced. Using the illumination and variation within the contrast-enhanced neighborhoods, the image is remapped to a reduced dynamic range to generate an output image.

19 Claims, 13 Drawing Sheets
(11 of 13 Drawing Sheet(s) Filed in Color)

(56) References Cited

OTHER PUBLICATIONS

Debevec, P.E, et al., 1997, Recovering High Dynamic Range Radiance Maps from Photographs, In: Proc. ACM SIGGRAPH 97, T. Whitted, Ed., pp. 369-378, 1997.
Fattal, R., et al., "Gradient Domain High Dynamic Range Compression," Proceedings of the 29th Annual Conference on Computer Graphics and Interactive Techniques, pp. 249-256, 2002.
Reinhard, E. et al., "Photographic Tone Reproduction for Digital Images," in SIGGRAPH 02 Conference Proceedings, pp. 267-276, 2002.
Tumblin, J. et al., "LCIS: A Boundary Hierarchy for Detail-Preserving Contrast Reduction," in SIGGRAPH 99 Conference Proceedings, pp. 83-90, 1999.

* cited by examiner

SPATIALLY ADAPTIVE TONE MAPPING OPERATOR

RELATED APPLICATIONS

This application claims the benefit of the priority of U.S. Provisional Application No. 62/360,888, filed Jul. 11, 2016, which is incorporated herein by reference in its entirety.

FIELD OF THE INVENTION

The present invention relates to method and system for a spatially-adaptive tone mapping, and more particularly to a tone mapping operator that reduces illumination dynamic range and enhances local reflective contrast

BACKGROUND OF THE INVENTION

High dynamic range (HDR) scenes often occur in natural settings. Outdoor scenes that include direct sunlight and deep shadows inherently have a large dynamic range. HDR scenes also often occur in surveillance settings, e.g., scenes that include both indoor and outdoor illumination. Common display devices, LCD flat panel displays, CRTs, and color prints, and the human eye have a limited dynamic range: roughly 100:1. In computer graphics, the dynamic range of scene is expressed as the ratio of the highest scene luminance to the lowest scene luminance. Photographers tend to be most interested in the ratio of the highest and lowest luminance regions where detail is visible. This can be seen as a subjective measure of dynamic range. The "key" of a scene indicates whether it is subjectively light ("high-key"), normal ("mid-key") or dark (low-key'). Dynamic range can also be expressed as the difference between the highest and lowest scene zones, where the zones relate logarithmically to the scene luminances.

Displaying HDR scenes captured with a wide dynamic range (WDR) digital still or video cameras, multiple images with different exposure times, different cameras, or advanced sensor readout techniques (e.g., the ExDRA™, an adaptively-binned sensor, disclosed in U.S. Pat. No. 8,786,732, incorporated herein by reference) requires that there is some process to reduce the dynamic range, i.e., a tone mapping operator (TMO). Many TMOs have been developed to solve the problem of mapping WDR camera output into a lower dynamic range suitable for compression, transmission, and display. The Retinex [1,2] algorithm, for example, relies on pixel values near a pixel of interest to determine a local illumination, and local illumination values are compressed globally while pixel contrast relative to neighboring pixels with the same local illumination is preserved. The basic Retinex method produces some artifacts; most notably, haloes appear around very bright or dark localized regions. There are many other TMOs described in the literature. Reinhard et al. [3] describe a method called "Photographic Tone Reproduction" that was inspired by the "dodging and burning" techniques used by photographers to print HDR images from film. In these techniques, light is either withheld from or added to a portion of the print during development. Tumblin and Turk [4] use a diffusion algorithm to decompose an image into a set of simpler images. This low curvature image simplifier (LCIS) TMO compresses global dynamic range, while at the same time preserves small-scale structure and low-level features. Fattal, et al. [5] have developed a TMO that depends on finite difference estimates of the two-dimensional gradients in the logarithm of the image luminance. The magnitudes of the gradients are reduced for large gradients and preserved for small gradients. The Fattal, Lischinski, and Werman[5] TMO produces HDR images for display without significant halo artifacts. This TMO involves the approximate iterative solution of a differential equation. In addition to the methods mentioned here, there are many other note-worthy TMOs.

In spite of the progress in TMOs, no ideal solution exists for processing the output of WDR digital cameras. The system and method disclosed herein relates to a TMO that is somewhat similar to the Reinhard et al. TMO. The TMO described herein includes both global contrast reduction of a HDR image and contrast enhancement within local parts of that image. Each pixel serves as the center of a local region for determining the local level of illumination. The residual luminance, the difference between the image luminance and the local level of illumination, is preserved and enhanced while large global illumination differences are tone mapped to lower levels. Because of this combination of features, we call our operator a TMCEO, Tone Mapping Contrast Enhancement Operator.

A common method to globally tone map a HDR image is to apply a sigmoid-shaped (e.g., an inverse tangent) function to the luminance channel of the image. A simple operator that does this is:

$$L_d(x, y) = \frac{L(x, y)}{1 + L(x, y)}, \quad (1)$$

where $L_d(x,y)$ is the luminance used for display and $L(x,y)$ is the luminance channel of the HDR image scaled such that a mid-level gray in the image is mapped to a value based on the image content. Reinhard et al. [3] scale the log-average luminance (average of the logarithm of the image expressed as a linear luminance—note that the Reinhard et al. paper has a formula for this, but it is incorrect) to 0.18 on a scale of zero to one for a scene that contains a "normal" mix of high and low luminance values. The global tone map described above over-compresses the contrast in high luminance regions resulting in a loss of detail. The solution to this problem is to apply a local TMO. The TMO developed by Reinhard et al. uses an estimate of the local illumination given by a locally averaged luminance determined over an adaptive size scale. The locally averaged luminance is used to remap the image luminance to a smaller global range for display by an equation that is similar to a sigmoid function:

$$L_d(x, y) = \frac{L(x, y)}{1 + V_1(x, y, s_m(x, y))}, \quad (2)$$

where $V_1(x,y,s_m(x,y))$ is the locally averaged luminance. $V_1(x,y,s_m(x,y))$ is determined by the convolution of the image luminance and a normalized Gaussian with a location dependent size parameter $s_m(x,y)$.

The size parameter, $s_m(x,y)$, in the Reinhard et al. TMO, is found essentially by a difference-of-Gaussians method. The difference-of-Gaussians function used in this TMO (referred to by Reinhard et al. as the "center surround function") is:

$$V(x, y, s) = \frac{V_1(x, y, s) - V_2(x, y, s)}{2^\phi a/s^2 + V_1(x, y, s)}, \quad (3)$$

where $V_1(x,y,s)$ is the convolution of the image luminance and a Gaussian kernel function centered at pixel location (x,y) in the image, s is the size scale of the Gaussian kernel (the radius to the two-sigma point), $\phi$ is a parameter to control the center surround function, $V(x,y,s)$, at small values of $V_1(x,y,s)$, and a is the log-average luminance of the scaled image. The value of the parameter a is referred to as the "key value" because it relates to the key of the image after scaling is applied. $V_2(x,y,s)$ is also a Gaussian weighted average, the convolution of the image luminance and a Gaussian kernel, just like $V_1(x,y,s)$, except that the size parameter used to calculate the kernel in $V_2(x,y,s)$ is scaled to the next larger Gaussian in a discrete set of "nested" Gaussians, spaced logarithmically in size. For the examples of their TMO processed images presented in Reinhard et al. [3], they use eight size scales, and each successive value is 1.6 times the previous size scale. The local scale is found by finding the scale, $s_m(x,y)$, in this small set of possible values, that satisfies both:

$$|V(x,y,s_k(x,y))| < \varepsilon \forall k \text{ such that } k<m \text{ and } |V(x,y,s_m(x,y))| \geq \varepsilon, \quad (4)$$

where $\varepsilon$ is a small parameter (e.g., 0.05). (It should be noted that this description has been modified from that presented in Reinhard et al. because there are some mistakes in that description.) Pixels within a circle of radius equal to roughly the scale of the Gaussian used for $V_1(x,y,s_m(x,y))$, i.e., $s_m(x,y)$, are within the region of approximately constant illumination. The next larger scale, the scale used in $V_2(x,y,s_m(x,y))$, i.e., $1.6 \times s_m(x,y)$, describes a larger circle that reaches regions with a higher or lower illumination—this causes the absolute difference of Gaussians to increase and the second inequality in Equation 4 is satisfied. Because the kernels used for convolution and smoothing are Gaussians, their support extends to large distances from the center. The regions or zones of approximately uniform illumination have a size that depends also on the illumination differences between adjacent regions. But, in general, the Gaussian weighted average luminance (the local illumination function) is determined over a local region of a size that depends on the distance to the closest nearby region with a different illumination. For a HDR image, regions with small local scales dominate near a large step in illumination. Large areas of uniform texture have large local scales. The nature of the local illumination function, a size-adaptive, locally-averaged luminance, and the TMO mapping function developed by Reinhard et al. greatly reduce the creation of halo artifacts.

The Reinhard et al. TMO works reasonably well for many HDR images, but does not work particularly well for the dim regions of high key (mostly bright) images. The lowest values are mapped to values so close to zero that, in these kinds of images, a human cannot pick out much detail in the darker regions. Accordingly, the need remains for a TMO mapping function and a contrast enhancement step that can be usefully combined to increase the visible detail in dark parts of HDR images.

BRIEF SUMMARY

According to an exemplary embodiment, a tone mapping operator (TMO) function combines the use of locally determined illuminations (or approximations to the local illumination) and locally determined variances (or equivalently local standard deviations). The illumination and variance are then used to increase contrast locally and to decrease the global contrast of HDR images. The TMCEO described herein provides a concrete example of just one implementation of the inventive approach, and the example presented is not intended to be restrictive. Many other schemes can be developed. The core idea is to use locally adaptive neighborhoods to determine regions of roughly constant illumination to remap the dynamic range of the image to a smaller range and using these same neighborhoods to measure the range of reflectances to simultaneously boost image contrast.

In one aspect of the invention, a method for spatially-adaptive tone mapping in an input image having high dynamic range includes using a computing device to: determine within the image a plurality of local size scales, each comprising a neighborhood having substantially constant illumination; estimate a variation in reflectance within each neighborhood; enhance local contrast within each neighborhood; use the illumination and variation within the contrast-enhanced neighborhoods to remap the image with a reduced dynamic range; and generate an output image having reduced dynamic range relative to the input image.

In another aspect of the invention, the method for spatially-adaptive tone mapping in an image having high dynamic range includes receiving in a computer processor input image data corresponding to a plurality of pixels having pixel locations; determining within the input image data a plurality of local size scales, each comprising a neighborhood of pixel locations having substantially constant local illumination; estimating a variation in reflectance within each neighborhood; enhancing local contrast within one or more of the neighborhoods based upon a level of local illumination; combining the illumination and variation within each of the one or more neighborhoods that are contrast-enhanced and any other neighborhoods that are not contrast-enhanced to remap the image with a reduced dynamic range; and generating an output image having reduced dynamic range relative to the input image. In an exemplary implementation, the step of determining includes convolving pixels within the input image data with each of a set of nested kernels. The set of nested kernels may consist of inverted truncated parabolas. In a particularly preferred embodiment, the image sensor comprises an adaptively-binning image sensor. The plurality of local size scales may have different shapes and sizes. Enhancing local contrast may include boosting contrast in neighborhoods having low- or mid-level illumination values. Estimating the variation in reflectance may include estimating a local standard deviation and may further include generating a standard deviation at each pixel using the local standard deviation. Color information may be extracted from the input image data to color to the reduced dynamic range image prior to output.

The method may further include detecting a noise level within the image data, wherein boosting local contrast is adaptively reduced the one or more pixel regions when the noise level would be amplified above a predetermined level. In some embodiments, wherein the image data is a plurality of video frames, the noise level may be estimated based on frame to frame differences.

In still another aspect of the invention, the method for spatially-adaptive tone mapping in an image having high dynamic range includes inputting into a computer processor input image data, the image data comprising a plurality of pixels having pixel locations; convolving the image data with a plurality of kernels to identify a plurality of pixel regions of substantially constant local illumination; estimating a variation in reflectance within each identified pixel region; boosting local contrast within one or more of the pixel regions based upon a level of local illumination;

combining the illumination and reflectance variation within each of the one or more neighborhoods that are contrast-boosted and any other pixel regions that are not contrast-boosted to remap the image with a reduced dynamic range; and generating an output image having reduced dynamic range relative to the input image. The plurality of kernels may be nested kernels of different sizes. In some embodiments, the nested kernels are inverted truncated parabolas.

In a particularly preferred embodiment, the image sensor comprises an adaptively-binning image sensor. Enhancing local contrast may include boosting contrast in pixel regions having low- or mid-level illumination values. Estimating the variation in reflectance may include estimating a local standard deviation and may further include generating a standard deviation at each pixel using the local standard deviation. Color information may be extracted from the input image data to color to the reduced dynamic range image prior to output.

The method may further include detecting a noise level within the image data, wherein boosting local contrast is adaptively reduced the one or more pixel regions when the noise level would be amplified above a predetermined level. In some embodiments, wherein the image data is a plurality of video frames, the noise level may be estimated based on frame to frame differences.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A depicts the image as processed using the inventive TMCEO method, using parameter set A (enhanced low-level contrast); FIG. 1B shows the image obtained using the TMCEO with parameter set B (no enhanced contrast); FIG. 1C shows the image obtained without this TMCEO, but processing by clipping and saturating at a level that allows display of the mid-luminance values in the HDR image.

DETAILED DESCRIPTION OF EXEMPLARY EMBODIMENTS

Figure 1A:
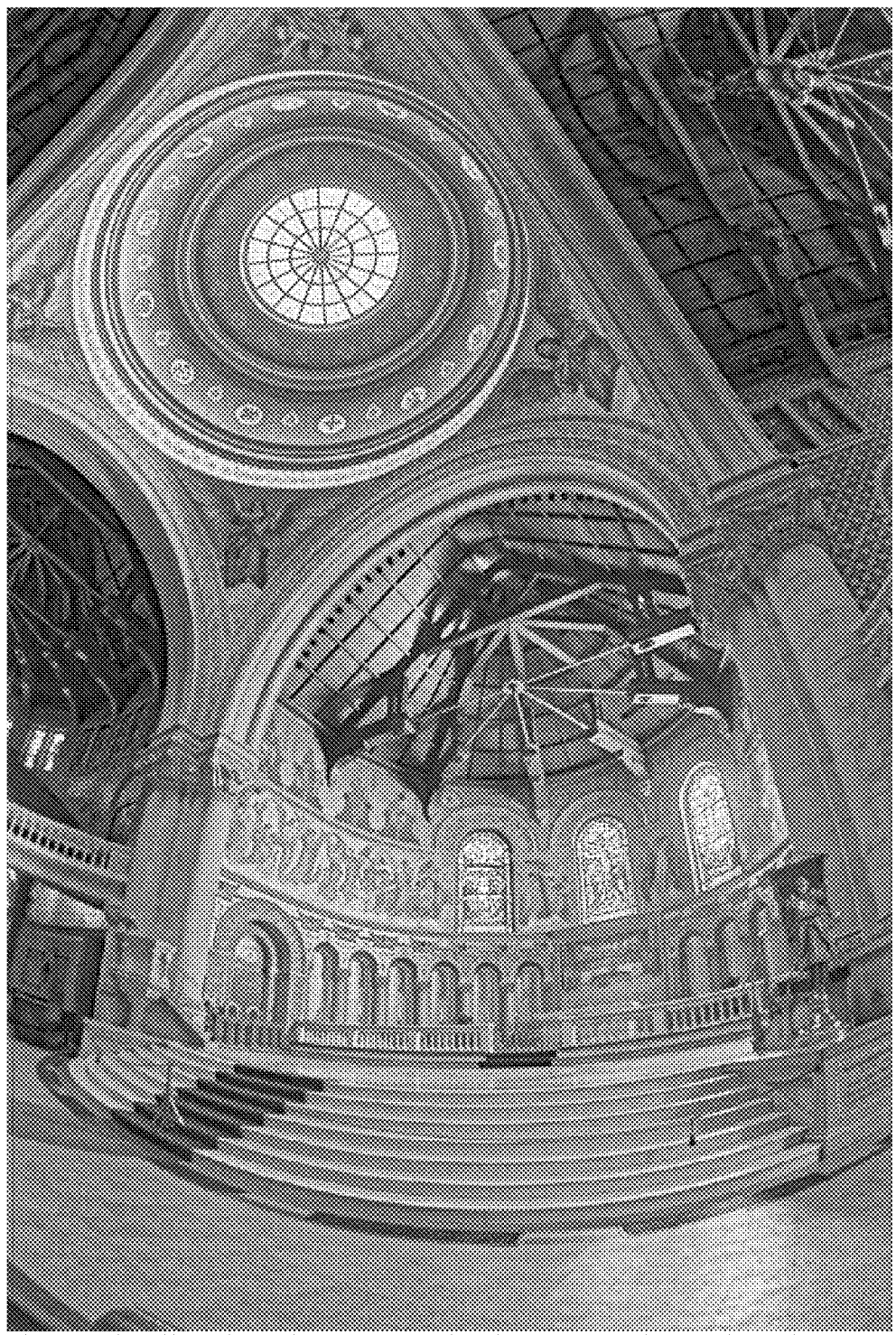
FIGS. 1A-1C are photographic images of the Stanford Memorial Chapel, where

In an exemplary embodiment, the inventive method includes a first step to establish the local size scale over which illumination is approximately constant and outside of which the illumination changes. This is the local illumination scale, $r_m(x,y)$. The possible values of $r_m(x,y)$ are limited to one of a sequence of logarithmically spaced radii: $r_i = f^{(i-1)} r_0$ for i=1 to i=$i_{max}$ where f is the scale factor between successive sizes (f is a constant, e.g., 1.4) and $r_0$ is the smallest radius ($r_0$ is a constant, e.g., 1.6 pixels). The $r_i$ are the size scales for the nested convolving kernels similar to the size scales of the Reinhard et al. nested Gaussian kernels. In general, a wide variety of kernel shapes can be used. However, our preference is for kernels with finite support as our measurements are intended to be local and should not be affected by large changes in the wings of the kernel function. To give a concrete example, we will use here a nest of logarithmically sized, inverted, truncated parabolas as the set of kernels for convolution. The kernels obey:

$$K_i(x, y) = C_i \left(1 - \frac{x^2 + y^2}{r_i^2}\right) \text{ for } x^2 + y^2 < r_i^2 \text{ and} \quad (5)$$

$$K_i(x, y) = 0 \text{ for } x^2 + y^2 \geq r_i^2,$$

where x and y are measured from the center of the kernel in pixels and $C_i$ is used to normalize the kernel to unit integral. Once each kernel is convolved with the image, the illumination size scale, $r_m(x,y)$, is determined using a difference of the kernel-weighted, average luminance as in Reinhard et al. and Equations 3 and 4 above. The local illumination at each pixel is the kernel-weighted, average luminance at the scale found (we use the symbol $V_m(x,y)$ for the kernel-weighted average luminance instead of $V_1(x,y,s_m(x,y))$ as used in Reinhard et al.):

$$V_m(x,y) = L(x,y) \otimes K_m(x,y), \quad (6)$$

where $\otimes$ represents the convolution operation, $L(x,y)$ is the re-normalized HDR input image luminance channel, and $K_m(x,y)$ is the kernel associated with $r_m(x,y)$, the illumination size scale found at pixel (x,y). In practice, the entire image is convolved with each possible kernel producing a set of convolved images that provide input to the local scale selection process. A binary masking operation and the set of convolved images then is used to create the local illumination image, $I(x,y)$, such that $I(x,y)$ at each pixel is the value of the function $V_m(x,y)$ from Equation 6.

Note that the local illumination image, $I(x,y)$, described above, does not accurately describe the local illumination because it is not possible to uniquely divide the luminance, $L(x,y) = R_f(x,y) I(x,y)$ into the reflectance, $R_f(x,y)$, and the illumination, $I(x,y)$. But in practice, the $I(x,y)$ image, which is an illumination approximation, is useful for reducing the dynamic range of the image in the TMO part of the method described here.

The next step is to estimate the variation in reflectances in each of the neighborhoods found in the previous TMO step. This can be done in a variety of manners, but to give a concrete example we will calculate a local standard deviation. The standard deviation image is formed from the residual image:

$$R(x,y) = L(x,y) - I(x,y), \quad (7)$$

where $R(x,y)$ is the residual luminance. A local standard deviation is estimated using convolution with the same set of kernel functions as used for the illumination:

$$\varphi_i(x,y) = \sqrt{(R^2(x,y)) \otimes K_i(x,y)}, \quad (8)$$

where $\varphi_i(x,y)$ is the local standard deviation found by weighting with a kernel of scale size $r_i$. A binary masking operation, using the same masks and thus the same size scales selected in the local illumination image calculation, is used to generate a standard deviation, $\sigma(x, y)$, at each pixel. Thus, $I(x,y)$ and $\sigma(x, y)$ are calculated using exactly the same pixels surrounding the pixel at location $(x,y)$ and the same weights at each surrounding pixel.

The tone mapping global dynamic range reduction and local contrast enhancement are done using a single formula once the size scales, $I(x,y)$, $R(x,y)$, and $\sigma(x, y)$ have been calculated. These calculations can be done without access to the entire image because the truncated, inverted parabolas used as kernels have finite support (e.g., in the examples run using this code, the largest matrix used for the largest size kernel is 17×17, so a full calculation can begin when the first 17 lines of an image are available to the processor). While many different TMO/contrast enhancement mappings can be performed with the quantities collected in the image analysis described above, one potential formula for the TMO/contrast enhancement operator (TMCEO) that includes some constants to vary the amount of contrast enhancement at low and mid-illumination levels is given by:

$$L_d(x, y) = \frac{\gamma + \beta I(x, y)}{1 + I(x, y)} + \left(\alpha + \frac{\sigma(x, y)}{1 + I(x, y)}\right)\left(\frac{R(x, y)}{\sigma(x, y)}\right), \quad (9)$$

or, after some algebra, equivalently:

$$L_d(x, y) = \frac{\gamma + \beta I(x, y) + R(x, y)}{1 + I(x, y)} + \frac{\alpha R(x, y)}{\sigma(x, y)}, \quad (10)$$

where $L_d(x,y)$ is the reduced dynamic range linear image, and $\alpha$, $\beta$, and $\gamma$ are the parameters that control the contrast boost. Negative values produced by Equation 9 or 10 are assigned a value of zero.

The reduced dynamic range image, $L_d(x,y)$, can have some "outlier" pixels with very high relative luminance values using this TMO. The highest values in the histogram of luminance values are remapped to lower values after the entire image has been processed and a histogram of luminance values has been calculated. The re-mapping involves selecting a fraction of the pixel values (e.g., 0.01—the brightest 1% of pixels) and compressing those brightest luminance values to a reduced range (e.g., to 0.9 to 1.0 where 1.0 is the maximum luminance in the reduced dynamic range image).

Color information can be restored to the image using linear color ratios from the original HDR image, although other methods could also be used. The resulting linear tri-color representation, $R_d(x,y)$, $G_d(x,y)$, $B_d(x,y)$, can then be converted to a non-linear color space, sRGB or Y'CbCr, for compression, transmission and display. A bit-depth of eight bits in the sRGB or Y'CbCr space is sufficient because the TMO has mapped the HDR image into a much lower dynamic range image. Eight bits is a common bit depth for compression and transmission although other bit depths could be considered. In addition, most color monitors, both CRT and LCD flat panel, have a dynamic range that can be completely represented in eight-bit sRGB or eight-bit Y'CbCr.

EXAMPLE 1

TMCEO Processing of Architectural Image

The performance of the inventive TMCEO approach can be judged by applying the sample algorithm of Equations (9) and (10) to several HDR images. A common set of test images used to test TMOs is the Debevec Library [6] of HDR images. The test images were all processed with two sets of values for the parameters that control the sample TMCEO of Equations (9) and (10): set A with $\alpha$=0.36, $\alpha$=0.03, $\beta$=1.0, $\gamma$=0.03 (FIG. 1A), and set B with $\alpha$=0.36, $\alpha$=0.0, $\beta$=1.0, $\gamma$=0.0 (FIG. 1B). The parameters of set A are used to enhance the contrast in regions with low illumination levels. In set A, non-zero values of $\alpha$ and $\gamma$ are both needed because $\alpha$ times the ratio of the residual to the local standard deviation is a term in the equation for the reduced dynamic range luminance (Equation 10). The ratio of the residual to the local standard deviation can be positive or negative, so there must be a positive shift to a base level above zero as provided by a positive, non-zero value for $\gamma$. The value of $\beta$ can be set to less than one to provide a boost in contrast in regions with mid-level illumination values. The parameters of set B illustrate the operation of the TMO without the low luminance contrast boost. The results of the TMO operating on an image of the Stanford Memorial Chapel are shown in FIG. 1A-1C, where FIG. 1C provides an example of processing by clipping and saturating at a level that allows display of the mid-luminance values in the HDR image.

Figure 1B:
Figure 1C:

Comparison of FIGS. 1A-1C demonstrates that the TMCEO with parameter set A produces better visibility of the details in the floor area and in the pillars (a contrast boost) and produces visible detail throughout the HDR image in all illumination areas. Stronger contrast boost can be produced by increasing the values of $\alpha$ and $\gamma$ above the values used in parameter set A. For surveillance purposes, the parameters in parameter set A provide good results for all six images in the Debevec Library.

EXAMPLE 2

TMCEO Processing of Landscape Image

Figure 2A:
FIGS. 2A-2C are photographic images of the Vine Sunset HDR image from the Debevec Library processed using the TMCEO approach described herein (FIGS. 2A and 2B) with parameter set A (FIG. 2A), and B (FIG. 2B), and a simple clipped version (FIG. 2C).
Figure 2B:
Figure 2C:

FIGS. 2A-2C show the Vine Sunset HDR image from the Debevec Library processed using this TMO with parameter sets A and B and processed with just clipping above a fixed high luminance value, respectively.

The Vine Sunset HDR image from the Debevec Library is a high key image (dominated by bright regions). The Reinhard et al. TMO produces little visibility of details in the dark regions of high key images in general. By using the TMCEO described here, with the contrast enhancement turned on, the details in the low light regions of the image are more apparent, as can be seen in FIG. 2A. The contrast enhancement produces some pixels that are mapped to black in FIG. 2A. Such artifacts depend on the noise level in the image—there is a fair amount of noise in the sky region of this image and this noise, contrast enhanced, produces the dark pixels. From a surveillance perspective, FIG. 2A is preferred over the bottom two panels because the dark regions of FIG. 2A have substantially more visible detail.

EXAMPLE 3

TMCEO Processing of Architectural Image

Figure 3B:
FIGS. 3A and 3B provide a comparison of the results of image processing using the methods described by Ward Larson et al. (image from Fattal, et al. [5]). and the inventive TMCEO method, respectively.
Figure 3A:

FIGS. 3A and 3B provide a comparison of image processing using the method described by Ward Larson, G., Rushmeier, H., and Piatko, C. ("A Visibility Matching Tone Reproduction Operator for High Dynamic Range Scenes," in IEEE Transactions on Visualization and Computer Graphics 3, 4, 1997, pp. 291-306), shown in FIG. 3A and the same image processed using the TMCEO method (FIG. 3B). The image is from Fattal, R., Lischinski, D., and Werman, M. ("Gradient Domain High Dynamic Range Compression," in Proc. SIGGRAPH Annu. Conf. Computer Graphics, 2002, pp. 249-256.)

EXAMPLE 4

TMCEO Processing of Architectural Image

Figure 4B:
FIGS. 4A and 4B provide a comparison of image processing as described by Fattal, et al. [5] and the inventive TMCEO method, respectively.
Figure 4A:

FIGS. 4A and 4B provide a comparison of image processing using the method described by Fattal, R., Lischinski, D., and Werman, M. ("Gradient Domain High Dynamic Range Compression," in Proc. SIGGRAPH Annu. Conf. Computer Graphics, 2002, pp. 249-256), shown in FIG. 4A and the same image processed using the TMCEO method (FIG. 4B).

EXAMPLE 5

TMCEO Processing of Architectural Image

Figure 5B:
FIGS. 5A and 5B provide a comparison of image processing using the method described by Tumblin J., and Turk, G. [4] and the TMCEO method, respectively.
Figure 5A:

FIGS. 5A and 5B provide a comparison of image processing using the method described by Tumblin J., and Turk, G. ("LCIS: A Boundary Hierarchy for Detail-Preserving Contrast Reduction," Proceedings of the 26th Annual Conference on Computer Graphics and Interactive Techniques, pp. 83-90, 1999), shown in FIG. 5A and the same image processed using the TMCEO method (FIG. 5B).

EXAMPLE 6

TMCEO Processing of Architectural Image

Figure 6B:
FIGS. 6A and 6B provide a comparison of image processing using the method described by Hasan, F. [7] and the same image processed using the TMCEO method, respectively.
Figure 6A:
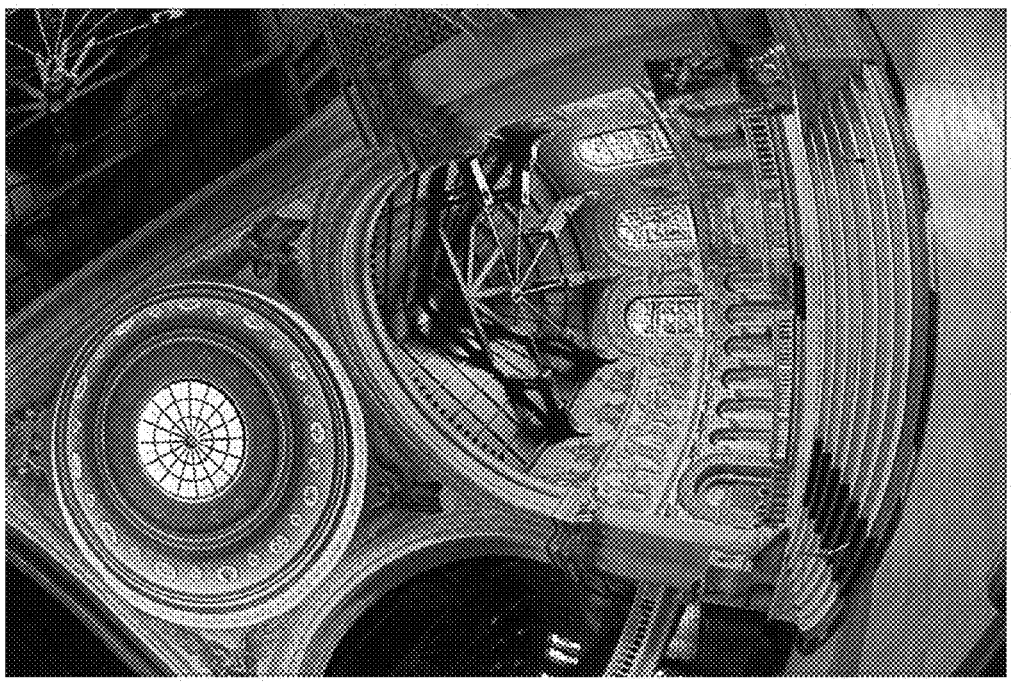

FIGS. 6A and 6B provide a comparison of image processing using the method described by Hasan, F., "Real-Time Embedded Algorithms for Local Tone Mapping of High Dynamic Range Images," University of Akron PhD Thesis, December, 2007), shown in FIG. 6A and the same image processed using the TMCEO method (FIG. 6B).

EXAMPLE 7

TMCEO Processing of Landscape Image

Figure 7A:
FIGS. 7A and 7B provide a comparison of image processing using the method described by Hasan, F. [7] and the same image processed using the TMCEO method, respectively.
Figure 7B:

FIGS. 7A and 7B provide a comparison of image processing using the method described by Hasan, F., "Real-Time Embedded Algorithms for Local Tone Mapping of High Dynamic Range Images," University of Akron PhD Thesis, December, 2007), shown in FIG. 7A and the same image processed using the TMCEO method (FIG. 7B).

EXAMPLE 8

TMCEO Processing of Landscape Image

Figure 8A:
FIGS. 8A and 8B provide a comparison of image processing using the method described by Biswas and Pattanaik. [8] and the same image processed using the TMCEO method, respectively.
Figure 8B:

FIGS. 8A and 8B provide a comparison of image processing using the method described by Biswas, K. K. and Pattanaik, S., "A Simple Spatial Tone Mapping Operator for High Dynamic Range Images," Published in: Thirteenth Color Imaging Conference: Color Science and Engineering Systems, Technologies, and Applications, Scottsdale, Arizona; November 2005, pp. 291-296., shown in FIG. 8A and the same image processed using the TMCEO method (FIG. 8B).

Figure 9:
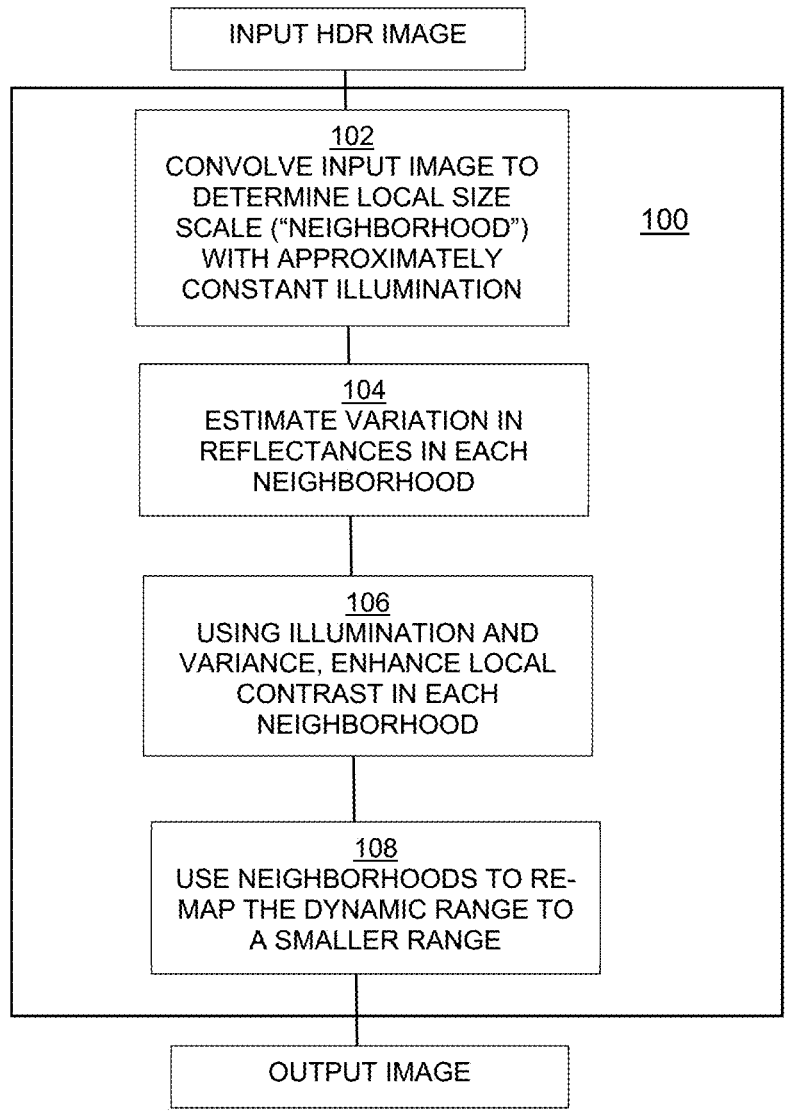
FIG. 9 is a block diagram showing an example of the process according to an embodiment of the inventive method.

Using the inventive method, the incorporation of a contrast boost operator into a TMO designed to reduce the dynamic range of a HDR image is efficient for a number of reasons. The TMO works as a contrast reduction agent over global size scales while preserving contrast over regions that show an approximately uniform illumination. A simple, separate pre- or post-processing stage of contrast boost would also boost the contrast between regions that are at different illumination levels, however, this would negate some of the benefit from the TMO dynamic range reduction. So, any contrast boost operation should take into account the dynamic range reduction process of the TMO. An easy way to do that is to use the same regions for illumination and contrast boost. FIG. 9 provides a block diagram of the process flow for one implementation of the TMCEO method. An HDR image is input into image processor 100, which includes a number of operational modules including step 102, to convolve the input image to determine the neighborhood, i.e., the local size scale that has approximately constant illumination; and step 104, to estimate the variation in reflectance in each neighborhood. This implementation uses the same illumination region sizes, the same illumination region convolution weights, and the same binary masks to calculate a local standard deviation. A contrast boost can be implemented by increasing the residual luminance relative to the local illumination (step 106). By adding a relatively low level of the residual luminance divided by the standard deviation and by adding a small constant to prevent too much underflow, a useful floor can be set to allow more visibility in regions with very low illuminations. In step 108, the dynamic range are re-mapped to a smaller range. An enhanced image is output with a reduced dynamic range.

The kernels used in our example are inverted, truncated parabolas. These work well in practice. Other kernels, even non-symmetric kernels, could be used to convolve the input image in order to find the regions of constant illumination. The use of pixel centered regions of various sizes and shapes make the code spatially adaptive allowing large illumination differences to be mapped down to a lower dynamic range while avoiding most artifacts. If a contrast boost operation is needed, then the large contrast differences that are mapped down by the dynamic range reduction in the TMO are not re-boosted by the contrast boost operator if the TMO is combined with the contrast enhancement function as described above in our sample TMCEO. The amount of contrast boost can be controlled by simple adjustment of a few parameters. For example, different amounts of contrast boost can be set for video intended for surveillance versus images intended for a movie.

The contrast boost parameters can be functions of location: $\alpha(x,y)$, $\beta(x, y)$, and $\gamma(x,y)$, or functions of the local illumination estimate: $\alpha(I(x,y))$, $\beta(I(x,y))$, and $\gamma(I(x,y))$. Applications that require fine-tuning of the contrast boost could set these parameters manually or through further automation written into the image-processing pipeline. One possible application of a local, illumination dependent contrast enhancement is a contrast enhancement that reduces automatically when the noise level in part of an image is high enough that noise would be amplified above some set level. The noise could be estimated from frame to frame differences in video after the frames are correlated to prevent triggering from motion in the scene. Or the noise could be estimated from the known WDR camera properties, the internal gain setting of the camera, and the local illumination level. Such adaptive local contrast enhancement could easily fit into the scheme proposed here that integrates TMO global contrast reduction with local contrast enhancement.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Figure 10:
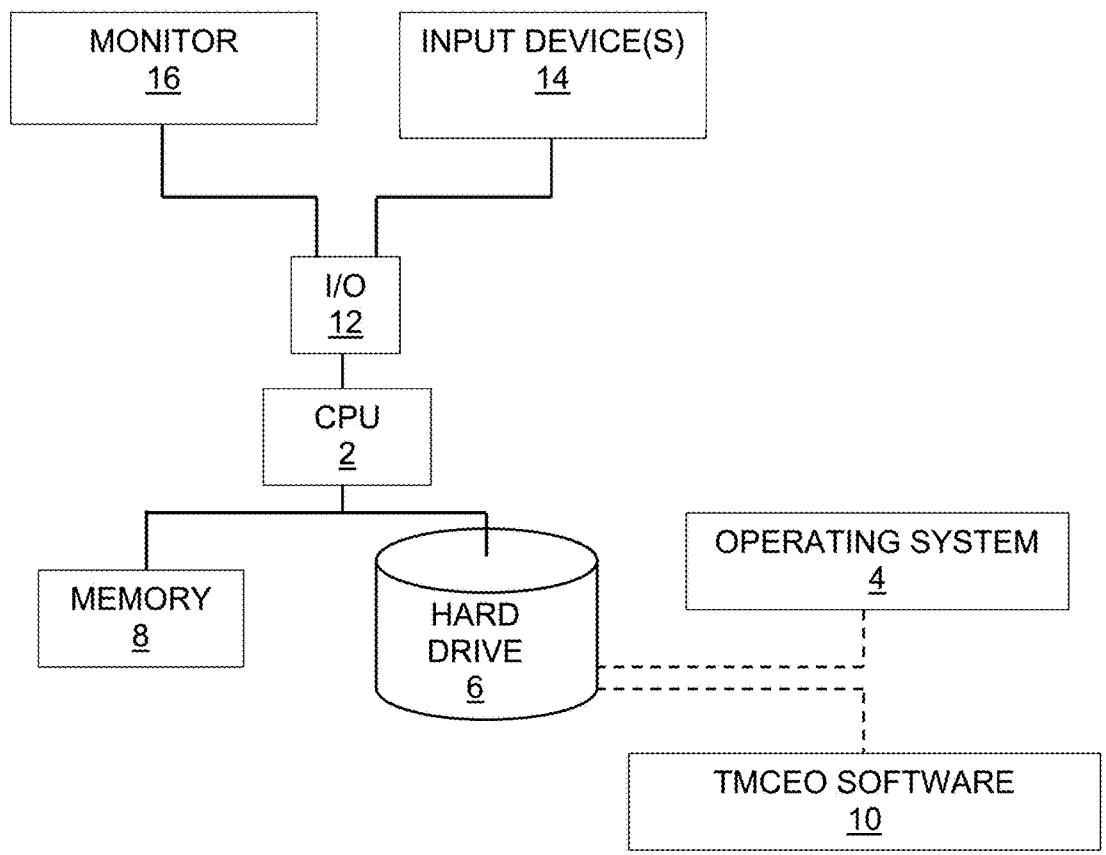
FIG. 10 is a block diagram of an exemplary computer system that may be used to execute a method according to an embodiment of the invention.

FIG. 10 illustrates an exemplary computer system that may be used to execute a method according to an embodiment of the invention. The computer system comprises a central processing unit (CPU) 2, operating system software 4, a hard disc 6, memory 8, an in/out (I/O) system 12, and TMO/contrast enhancement operator (TMCEO) software 10. In this embodiment, the TMCEO software 10 may comprise a computer program, or a suite of computer programs operable to carry out a method according to the embodiment of the invention. The I/O system 12 is connected to input devices 14 and a monitor 16, which is operable to display images before and after processing by an embodiment of the present invention. Additional output devices may include a video recorder and/or other image/video storage devices or media (external hard drive, DVD-ROM, CD-ROM, digital memory card, SD card, SDHC card, etc.) for creating a permanent or semi-permanent record of images, raw and processed, over time. User interface/input devices may include a keyboard, a mouse, an electronic pen, a touch screen, or a haptic device, which may be used to select and manage images for correction according to an embodiment of the invention.

The computer system may operate in a networked environment using logical connections to one or more remote computers, such as a personal computer, a hand-held device, a server, a router, a network PC, a peer device or other common network node. Network connections (wired or wireless) may be used to transmit the saved images (raw and processed) for remote storage and/or analysis. Such networking environments are commonplace in offices, enterprise-wide computer networks, intranets, the Internet, and other distributed network environments.

REFERENCES (INCORPORATED HEREIN BY REFERENCE)

1. Land, E. H., "Retinex", *American Scientist*, 52 (2), pp247-253, 255-264 (1964).
2. Land, E. H., and McCann, J. J., "Lightness and the Retinex Theory", *J. Opt. Soc. Amer.*, 61 (1) pp.1-11 (1971).
3. Reinhard, E., Stark, M., Shirley, P., and Ferwerda, J., "Photographic Tone Reproduction for Digital Images," in *SIGGRAPH 02 Conference Proceedings*, pp. 267-276, 2002.
4. Tumblin, J. and Turk, G., "LCIS: A Boundary Hierarchy for Detail-Preserving Contrast Reduction," in *SIGGRAPH 99 Conference Proceedings*, pp. 83-90, 1999.
5. Fattal, R., Lischinski, D., and Werman, M., "Gradient Domain High Dynamic Range Compression," *Proceedings of the 29th Annual Conference on Computer Graphics and Interactive Techniques*, pp. 249-256, 2002.
6. Debevec, P. E., and Malik, J., 1997, "Recovering High Dynamic Range Radiance Maps from Photographs, In: Proc. *ACM SIGGRAPH* 97, T. Whitted, Ed., pp. 369-378, 1997.
7. Hasan, F., "Real-Time Embedded Algorithms for Local Tone Mapping of High Dynamic Range Images," University of Akron PhD Thesis, December, 2007).
8. Biswas, K. K. and Pattanaik, S., "A Simple Spatial Tone Mapping Operator for High Dynamic Range Images," Published in: *Thirteenth Color Imaging Conference: Color Science and Engineering Systems, Technologies, and Applications*, Scottsdale, Ariz.; November 2005, pp. 291-296.

The invention claimed is:

1. A method for spatially-adaptive tone mapping in an image having high dynamic range, the method comprising:
    receiving in a computer processor input image data corresponding to a plurality of pixels having pixel locations;
    determining within the input image data a plurality of local size scales by convolving pixels within the input image data with each of a set of nested kernels having a truncated shape with finite support configured for local measurement, each local size scale comprising a neighborhood of pixel locations having substantially constant local illumination;
    estimating a variation in reflectance within each neighborhood;
    enhancing local contrast within one or more of the neighborhoods based upon a level of local illumination;
    combining the illumination and variation within each of the one or more neighborhoods that are contrast-enhanced and any other neighborhoods that are not contrast-enhanced to remap the image with a reduced dynamic range; and
    generating an output image having reduced dynamic range relative to the input image.

2. The method of claim 1, wherein the set of nested kernels comprises inverted truncated parabolas.

3. The method of claim 1, wherein the image sensor comprises an adaptively-binning image sensor.

4. The method of claim 1, wherein the plurality of local size scales has different shapes and sizes.

5. The method of claim 1, wherein enhancing local contrast comprises boosting contrast in neighborhoods having low- or mid-level illumination values.

6. The method of claim 1, wherein estimating the variation in reflectance includes estimating a local standard deviation.

7. The method of claim 6, further comprising generating a standard deviation at each pixel using the local standard deviation.

8. The method of claim 1, further comprising:
extracting color information from the input image data; and
prior to generating the output image, prior to generating the output image, restoring color to the reduced dynamic range image using the extracted color information.

9. The method of claim 1, further comprising detecting a noise level within the image data, wherein boosting local contrast is adaptively reduced the one or more pixel regions when the noise level would be amplified above a predetermined level.

10. The method of claim 9, wherein the image data comprises a plurality of video frames, and wherein the noise level is estimated based on frame to frame differences.

11. A method for spatially-adaptive tone mapping in an image having high dynamic range, the method comprising:
inputting into a computer processor input image data, the image data comprising a plurality of pixels having pixel locations;
convolving the image data with a plurality of nested kernels of different sizes to identify a plurality of pixel regions of substantially constant local illumination, wherein the nested kernels have a truncated shape with finite support configured for local measurement;
estimating a variation in reflectance within each identified pixel region;
boosting local contrast within one or more of the pixel regions based upon a level of local illumination;
combining the illumination and reflectance variation within each of the one or more neighborhoods that are contrast-boosted and any other pixel regions that are not contrast-boosted to remap the image with a reduced dynamic range; and
generating an output image having reduced dynamic range relative to the input image.

12. The method of claim 11, wherein the nested kernels comprise inverted truncated parabolas.

13. The method of claim 11, wherein the image sensor comprises an adaptively-binning image sensor.

14. The method of claim 11, wherein the plurality of kernels has different shapes and sizes.

15. The method of claim 11, wherein estimating the variation in reflectance includes estimating a local standard deviation.

16. The method of claim 15, further comprising generating a standard deviation at each pixel using the local standard deviation.

17. The method of claim 11, further comprising:
extracting color information from the input image data; and
prior to generating the output image, prior to generating the output image, restoring color to the reduced dynamic range image using the extracted color information.

18. The method of claim 11, further comprising detecting a noise level within the image data, wherein boosting local contrast is adaptively reduced the one or more pixel regions when the noise level would be amplified above a predetermined level.

19. The method of claim 18, wherein the image data comprises a plurality of video frames and further comprising estimating a noise level based on frame to frame differences.

* * * * *